US011263418B2

(12) United States Patent
Hwang et al.

(10) Patent No.: US 11,263,418 B2
(45) Date of Patent: Mar. 1, 2022

(54) SYSTEMS AND METHODS FOR MEMBER FACIAL RECOGNITION BASED ON CONTEXT INFORMATION (71) Applicant: TINOQ Inc., San Jose, CA (US)

(72) Inventors: Chan Soo Hwang, Sunnyvale, CA (US); Young Geun Cho, Palo Alto, CA (US); Daxiao Yu, Cupertino, CA (US)

(73) Assignee: Tinoq Inc., Santa Clara, CA (US)

( * ) Notice: Subject to any disclaimer, the term of this patent is extended or adjusted under 35 U.S.C. 154(b) by 216 days.

(21) Appl. No.: 16/545,722

(22) Filed: Aug. 20, 2019

(65) Prior Publication Data
US 2020/0065548 A1 Feb. 27, 2020

Related U.S. Application Data (60) Provisional application No. 62/720,758, filed on Aug. 21, 2018.

(51) Int. Cl.
G06K 9/00 (2006.01)
G06F 11/30 (2006.01)
G06K 9/72 (2006.01)

(52) U.S. Cl.
CPC ...... G06K 9/00013 (2013.01); G06F 11/3072 (2013.01); G06K 9/00288 (2013.01); G06K 9/00335 (2013.01); G06K 9/72 (2013.01)

(58) Field of Classification Search
CPC .. G06K 9/00013; G06K 9/00288; G06K 9/72; G06K 9/00335; G06K 9/00771; G06K 9/6277; G06K 2009/00328; G06F 11/3072

(Continued)

(56) References Cited

U.S. PATENT DOCUMENTS 6,032,109 A 2/2000 Ritmiller, III
6,043,493 A 3/2000 Kim et al.
(Continued)

FOREIGN PATENT DOCUMENTS

CN 101401426 A1 4/2009
CN 102754436 A1 10/2012
(Continued)

OTHER PUBLICATIONS

Castro et al., From Face Recognition to Models to Identity: A Bayesian Approach to Learning about Unknown Identities from Unsupervised Data, ECCV2018, arXiv: 1807.07872v1 [cs.CV], pp. 1-22. (Year: 2018).*

(Continued)

Primary Examiner — Ishrat I Sherali
(74) Attorney, Agent, or Firm — North Weber & Baugh LLP; Michael North (57) ABSTRACT Described herein are systems and methods that may autonomously identify a person of a member pool based on pictures of the person, without requiring the person's cooperation. Contextual information of the picture(s) along with the picture(s) are utilized. Contextual information may be the information that is related to current circumstances when the picture was taken. A system may comprise cameras that map appearances to visual data; a mapping function that maps identities and camera information to generate contextual information and a set of a priori probabilities; recognition functions that map the visual data to another set of probabilities, which match each of the visual data with each of the one of the identities; and a decision function that combines the set of a priori probabilities and the another set of probabilities to determine one of the plurality of the identities.

20 Claims, 7 Drawing Sheets

(58) Field of Classification Search
USPC .................................................. 382/115, 118
See application file for complete search history.

(56) References Cited

U.S. PATENT DOCUMENTS

| | | | |
|---|---|---|---|
| 7,114,079 | B1 | 9/2006 | Cook et al. |
| 7,602,421 | B2 | 10/2009 | Hunter et al. |
| 7,889,381 | B2 | 2/2011 | Suzuki et al. |
| 8,320,643 | B2 | 11/2012 | Nakanowatari et al. |
| 8,340,366 | B2 | 12/2012 | Masuda et al. |
| 8,457,367 | B1 | 6/2013 | Sipe et al. |
| 8,544,033 | B1 | 9/2013 | Acharya et al. |
| 8,856,541 | B1 | 10/2014 | Chaudhury et al. |
| 9,245,172 | B2 | 1/2016 | Koseki et al. |
| 9,300,925 | B1 | 3/2016 | Zhang |
| 9,336,456 | B2 | 5/2016 | DeLean |
| 9,342,744 | B2 | 5/2016 | Asa et al. |
| 9,691,221 | B2 | 6/2017 | Block et al. |
| 9,830,631 | B1 | 11/2017 | Dhua et al. |
| 10,303,930 | B2 | 5/2019 | Yu et al. |
| 2002/0113862 | A1 | 8/2002 | Center, Jr. et al. |
| 2005/0012818 | A1 | 1/2005 | Kiely et al. |
| 2005/0091338 | A1 | 4/2005 | de la Huerga |
| 2005/0164651 | A1 | 7/2005 | Ollis et al. |
| 2005/0213796 | A1 | 9/2005 | Koma et al. |
| 2006/0018522 | A1 | 1/2006 | Sunzeri et al. |
| 2007/0110422 | A1 | 5/2007 | Minato et al. |
| 2007/0117623 | A1 | 5/2007 | Nelson et al. |
| 2009/0043422 | A1 | 2/2009 | Lee et al. |
| 2009/0060293 | A1 | 3/2009 | Nagao et al. |
| 2009/0167883 | A1 | 7/2009 | Nozaki |
| 2009/0185723 | A1 | 7/2009 | Kurtz et al. |
| 2011/0103643 | A1 | 5/2011 | Salsman et al. |
| 2012/0230555 | A1 | 9/2012 | Miura et al. |
| 2012/0251079 | A1 | 10/2012 | Meschter et al. |
| 2013/0002869 | A1 | 1/2013 | Yuasa et al. |
| 2013/0208952 | A1 | 8/2013 | Auchinleck |
| 2013/0251216 | A1 | 9/2013 | Smowton et al. |
| 2013/2511216 | | 9/2013 | Smowton et al. |
| 2014/0044318 | A1 | 2/2014 | Derakhshani et al. |
| 2014/0330408 | A1 | 11/2014 | Rolley |
| 2015/0363642 | A1 | 12/2015 | Irie |
| 2016/0012379 | A1 | 1/2016 | Iwai |
| 2016/0261911 | A1 | 9/2016 | Soundararajan et al. |
| 2017/0078454 | A1 | 3/2017 | Berookhim et al. |
| 2017/0140141 | A1* | 5/2017 | Yan ..................... H04W 12/06 |
| 2017/0245101 | A1 | 8/2017 | Chandrasekaran et al. |
| 2017/0323376 | A1* | 11/2017 | Glaser ................. G06Q 20/203 |
| 2017/0347039 | A1 | 11/2017 | Baumert et al. |
| 2018/0232592 | A1 | 8/2018 | Stewart et al. |
| 2018/0336687 | A1 | 11/2018 | Mudretsov et al. |
| 2020/0012772 | A1* | 1/2020 | Cho ....................... G06F 21/32 |

FOREIGN PATENT DOCUMENTS

| | | |
|---|---|---|
| CN | 102804905 A1 | 11/2012 |
| CN | 104170316 A1 | 12/2012 |
| CN | 104380323 A1 | 4/2013 |
| CN | 103383723 A1 | 11/2013 |
| CN | 104636751 A1 | 5/2015 |
| EP | 1998567 B1 | 4/2016 |

OTHER PUBLICATIONS

Non-Final Office Action dated Aug. 5, 2020, in related U.S. Appl. No. 16/355,688, (48 pgs).
Non-Final Office Action dated Jun. 26, 2020 in related U.S. Appl. No. 16/355,683, (51 pgs).
International Search Report and Written Opinion dated Nov. 21, 2019, in International Patent Application No. PCT/US2019/47318, filed Aug. 20, 2019 (9 pgs).
Supplementary European Search Report dated Sep. 30, 2019, in European Patent Application No. 17776709.2, (62 pgs).
Supplementary Partial European Search Report dated Oct. 29, 2019, in European Patent Application No. 17760776.6, (33 pgs).
Notice of Allowance dated Oct. 7, 2020 in the related U.S. Appl. No. 16/355,683, (20 pgs).
International Search Report and Written Opinion dated May 18, 2017 in related International Patent Application No. PCT/US2017/020354, filed Mar. 2, 2017, (14 pgs).
International Search Report and Written Opinion dated Jun. 15, 2017 in related International Patent Application No. PCT/US2017/025183, filed Mar. 30, 2017, (17 pgs).
Non-Final Office Action dated Sep. 21, 2018, in U.S. Appl. No. 15/475,046, (11 pgs).
Non-Final Office Action Response filed Oct. 25, 2018, in U.S. Appl. No. 15/475,046, (9 pgs).
Non-Final Office Action dated Jun. 27, 2018, in U.S. Appl. No. 15/448,194, (19 pgs).
Non-Final Office Action Response dated Sep. 25, 2018, in U.S. Appl. No. 15/448,194, (11 pgs).
Notice of Allowance dated Jan. 17, 2019, in U.S. Appl. No. 15/448,194, (25 pgs).
Notice of Allowance dated Jan. 25, 2019, in U.S. Appl. No. 15/475,046, (24 pgs).
Supplementary European Search Report dated Apr. 28, 2020, in related European Application No. EP17760773.6, (44 pgs).
First Office Action dated Apr. 14, 2020 in related Chinese Patent Application No. 201780022142.X, (25 pgs).
Supplementary European Search Report in related Application No. EP17760773, (85 pgs).
Notice to Grant Patent Right dated Oct. 30, 2020 in the related CN Application No. 201780022142.X, (4 pgs).
Chinese office action dated Jul. 5, 2021, in the Chinese patent application No. 201780027135.9, (22 pgs).
Chinese office action response filed Sep. 17, 2021, in the Chinese patent application No. 201780027135.9, (7 pgs).

* cited by examiner

100

At a member's facility

Start (A) Obtain: probability each member in member pool attends the gym based on the time of check-in; list of check-in members; list of members in other group exercise studio; list of members who reserved the class; class schedule; list of members who previously attended the same class and/or the same type of classes and/or instructor, and/or the previous locations of the members for example detected by other cameras
102

(B) Find the list of members whose probability of attendance to the class meets a threshold
104

(C) Obtain the probability of match between the face in the picture (taken during a gym activity) and the profile pictures of members listed in (B)
106

(D) Obtain the probability of match between the non-facial features in the picture and the recent profile pictures including picture(s) taken at the check-in counter on the same day.
108

(E) Combine the probabilities computed in (A), (C), and/or (D) and find the member who maximizes the combined probability.
110

End

SYSTEMS AND METHODS FOR MEMBER FACIAL RECOGNITION BASED ON CONTEXT INFORMATION

CROSS REFERENCE TO RELATED PATENT APPLICATIONS

The present application claims priority benefit, under 35 U.S.C. § 119(e), to commonly-assigned U.S. Patent Application No. 62/720,758, filed on Aug. 21, 2018, entitled "SYSTEMS AND METHODS FOR MEMBER FACIAL RECOGNITION BASED ON CONTEXT INFORMATION," listing as inventors Chan Soo Hwang, Young Geun Cho, and Daxiao Yu, which application is herein incorporated by reference as to its entire content. Each reference mentioned in this patent document is incorporated by reference herein in its entirety.

BACKGROUND

A. Technical Field

The present disclosure relates generally to systems and methods for autonomously identifying a person of a member pool based on pictures of the person, and more particularly identifying a person based on pictures of the person without requiring the person's cooperation.

B. Background

Within a facility, where the access is limited to members, a facial recognition method may provide the identity of the member by comparing the subject's photo to photos of a member pool. The facility may be a physical fitness facility such as a gym. Prior art methods may have the following limitations:

(1) Facial recognition techniques typically require a frontal face capture of the subject to achieve a good performance; however, it may be difficult to install a camera to obtain a member's frontal face picture unless a member cooperates. Common problems of facial photos taken without user cooperation may include high yaw, pitch and roll; small size; and blurring due to motion. Therefore, facial recognition techniques may not provide a good recognition performance.

(2) As the size of member body grows, the accuracy of facial recognition algorithms may degrade. This situation may occur because the facial features may not be sufficient to distinguish members whose faces appear similar and the probability of having similar faces increases with the size of member body.

(3) The above two problems may be resolved by using non-facial features such as hair style, hair color, accessories such as necklaces, clothing, and gaits may be a tie breaker in determining facial recognition. However, many non-facial features may be time limited because they are not natural attributes of the person.

Accordingly, what is needed are systems and methods that can overcome these limitations and provide autonomous methods and systems to identify a person of a member pool based on pictures of the person, without the person's cooperation.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

Figure ("FIG.") 1A graphically illustrates a flow chart for member recognition according to embodiments of the present document.

DETAILED DESCRIPTION OF EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. Objectives

The present disclosure describes systems and methods that can overcome prior art limitations, as described herein, and provide autonomous methods and systems to identify a person of a member pool based on pictures of the person, without requiring the person's cooperation. To achieve these objectives, contextual information of the picture(s) along with the picture(s) are utilized. Contextual information may be the information that is related to current circumstances when the picture was taken. For example, but without limitations, the contextual information may include the location of the camera, time when the picture was taken, the relative location of the camera to the other cameras, the list of members who were in the facility, the list of members who were recognized by other cameras within the facility, the transaction history of the members, the reservation information, etc.

Embodiments of the present disclosure may be used in a facility that is only accessible by a group of member. Such facilities may include, but without limitation, gyms, educational institutes, shops, and other facilities with access control.

The following definitions may apply to embodiments of the present disclosure:
  A member is an individual who has right to enter a space where the access is limited to the members. The membership can be temporary; for example, a guest to an amusement park can be considered as a member because the individual entered an access controlled space with the amusement park's consent. The membership can be implicit; for example in this invention, a shopper who entered to a shop is considered as a member because the individual entered a space that is meant to be used only by shoppers and has access control devices such as security gate, door, or guard.
  A member pool is the list of members who have potential access to the space where the access is limited to the members.
  A member data is information on the history of the set of activities that members participate in at the member facility. For examples in a gym, members can attend classes, run on a treadmill, check-in at the front-desk. Member data may be stored in a database, member data 154, as illustrated in FIG. 1B.
  A transaction is defined as the provision of identity information from a member to the facility or its associates. For example, a credit card purchase is considered as a transaction because the member surrenders the credit card number that can be mapped to an identity. In another example, a check-in to a gym is considered as a transaction because the member provided the membership number to the gym.
  A probability in this invention has broad meaning. It can be the probability according to textbook definition, or the function of probability, or other metric that is related to probability.
  Contextual information is the information that is related to the circumstances when the picture was taken. For example, the location of the camera, time when the picture was taken, the relative location of the camera to the other cameras, the list of members who were in the facility, the list of members who were recognized by other cameras within the facility, the transaction history of the members, the reservation information, and so on. The contextual information includes the historical data on member pool activity of at least one member in the member pool.
  Facial feature is the features that are commonly used by facial recognition algorithms. These features include the facial geometry and other long lasting features.
  Non-facial feature is a feature that can be commonly unused by facial recognition algorithms because the time constant of their usage is insufficient. These features may include accessories, clothing, hair style, and other short-lived features.

B. Member Recognition

Figure 1A:
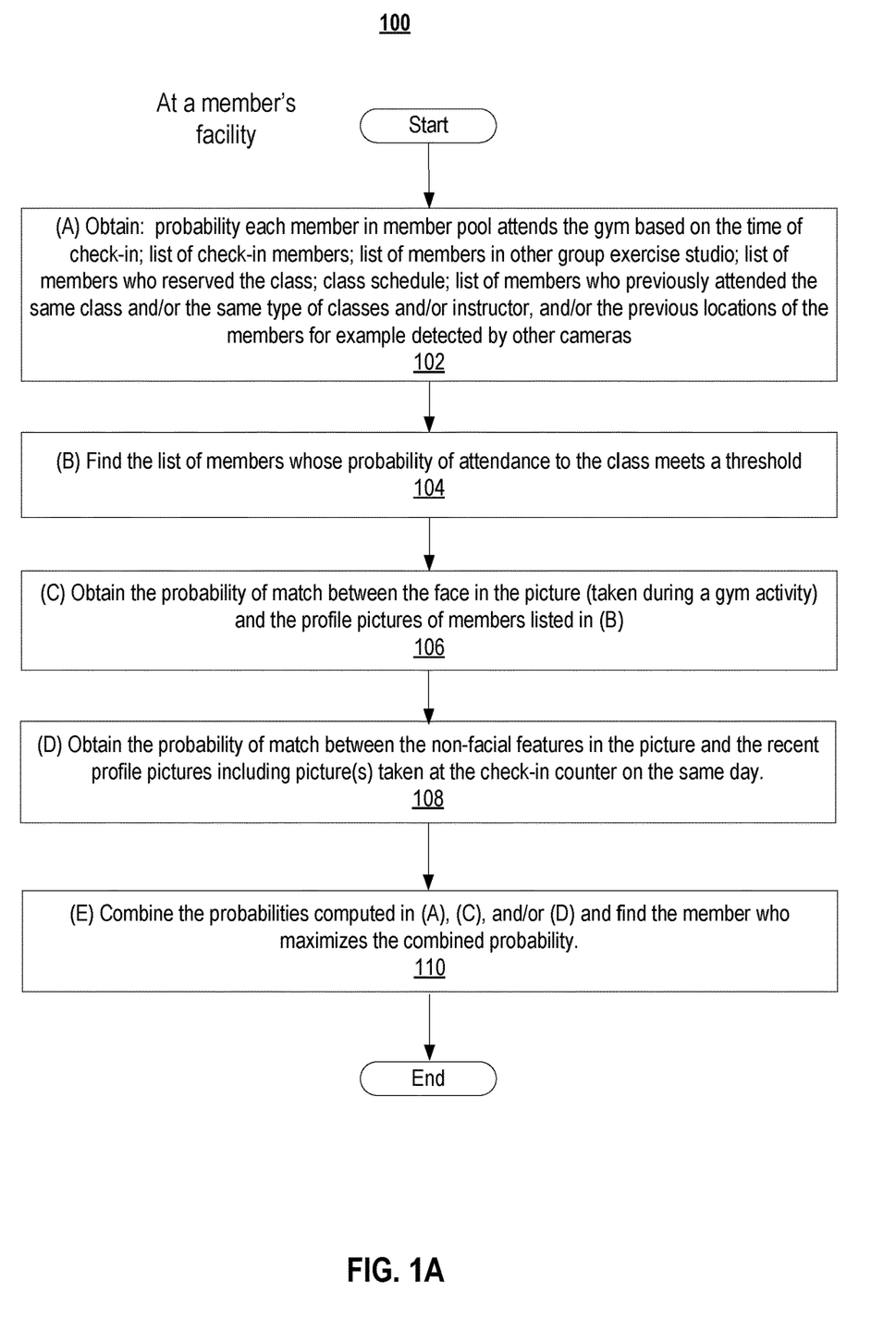
Figure 1B:
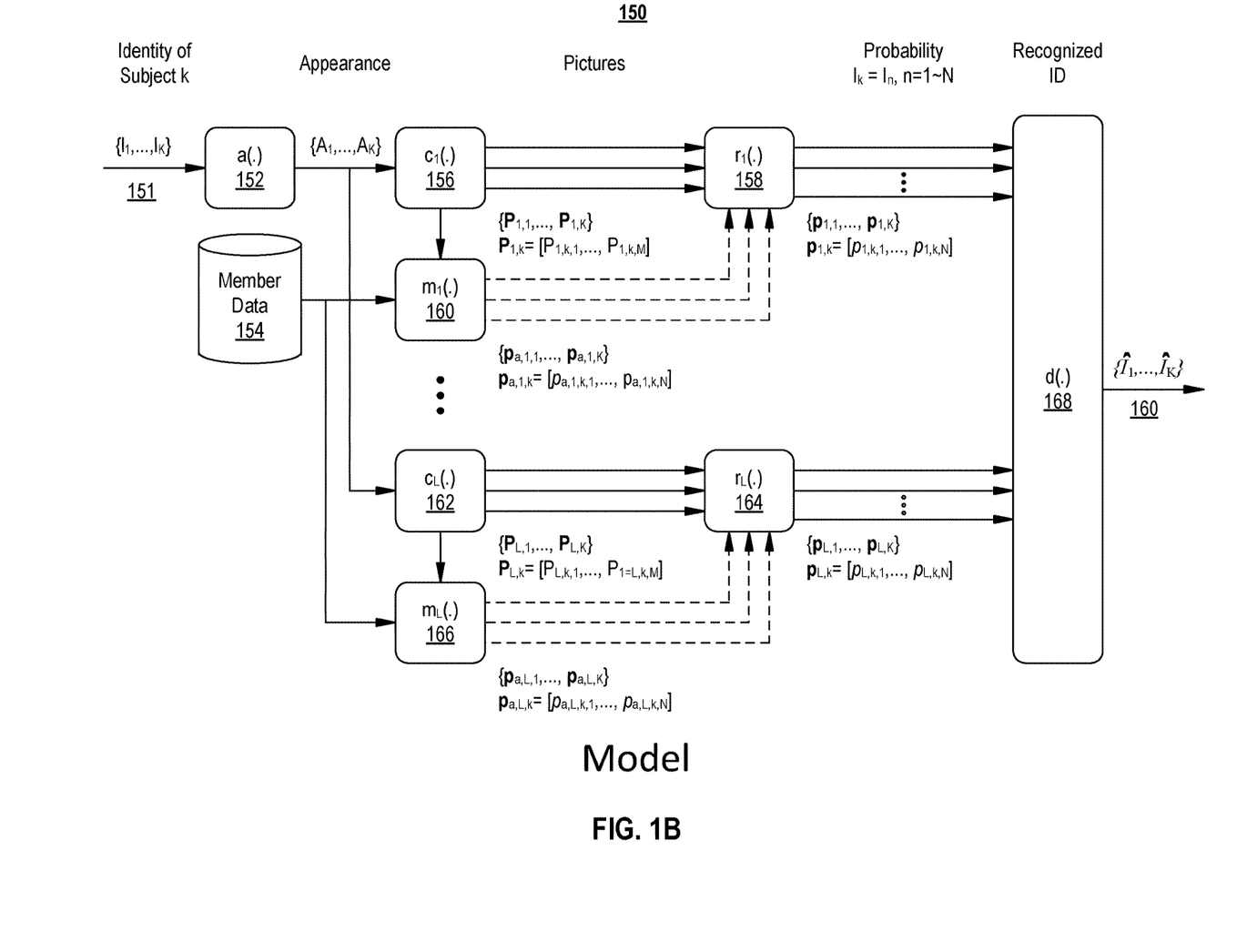
FIG. 1B depicts a model for a member recognition system according to embodiments of the present document.

FIG. 1A and FIG. 1B illustrate two examples, Example (1) and Example (2), respectively, of how the contextual information may be used along with the pictures.

Example (1) Consider a gym where there is a check-in counter and two (2) group exercise studios. At a check-in counter, a camera may be installed such that it is easy to get a frontal facial picture of members at check-in. A camera may be installed in each group exercise studio, but the camera may not be well configured to get frontal facial pictures of entering members due to space or other limitations. At the check-in counter, because a frontal facial picture is available, a member can be recognized by prior art methods. However, at the studio, prior art methods cannot provide an accurate recognition because a frontal facial picture may not be available.

The present disclosure may use a subset of the following contextual information to improve the recognition performance: time of check-in, the list of check-in members, the list of members in other group exercise studio, the member pictures taken at the check-in counter, the list of members who reserved the class, the class schedule, the list of members who previously attended the same class and/or the same type of classes, and/or the previous locations of the members for example detected by other cameras.

For Example (1), FIG. 1A graphically illustrates a flow chart 100 for member recognition according to embodiments of the present document. The followings are exemplary steps to use the contextual information per flow chart 100:

(A) Obtain the probability that each member in member pool attends the gym based on the time of check-in, the list of check-in members, the list of members in other group exercise studio, the list of members who reserved the class, the class schedule, the list of members who previously attended the same class and/or the same type of classes and/or instructor, and/or the previous locations of the members for example detected by other cameras. For example, the probability that a member attend the class is set to zero if the member is not listed in any of the aforementioned lists. In other example, the probability that Member m attends the Class c is $p_{mc}$ if the member has attended the same class for last 6 month with probability $p_{mc}$ and the member has checked into the gym before the class starts. (step 102)

(B) Find the list of members whose probability of attendance to the class meets a threshold. For example, this list can include all members if $p_{mc}$ is non-zero. In another example, the list can include members if $p_{mc}$ is greater than p T, where T is equal to a threshold. (step 104)

(C) Obtain the probability of a match between the face in a picture, taken during a gym activity, and the profile pictures of members listed in (B), (step 104). In this step, any facial recognition methods can be used and then the output of the recognition methods can be converted to probability based on historical matching rate. Note that the profile pictures may include the picture taken at the check-in counter. (step 106)

(D) Obtain the probability of match between the non-facial features in the picture and the recent profile pictures including picture(s) taken at the check-in counter on the same day. The non-facial features may include, but without limitation, hairstyle, hair color, accessories such as necklaces, clothing, and gaits. Non-facial features are short-lived (transient), so the present disclosure may compare the features to only recent pictures. Different features may have a different time-constant, i.e., time when the feature expires. For example, the hair color may last weeks or months whereas the accessories are valid feature only for hour. (step 108)

(E) Combine the probabilities computed in Steps (A), (C), and/or (D) and find the member who maximizes the combined probability. Note that the probability of the combine steps may include combining probabilities from different pictures if the pictures were taken of the same person. (step 110) One skill in the art will recognize that probabilities may be combined by various methods. In some embodiments, probabilities may be combined by multiplication of the probabilities. In some another embodiments, probabilities may be combined by combining likelihood ratios. In some another embodiments, probabilities may be combined by using Bayes rule.

For Example (2), FIG. 1B depicts a model 150 for a member recognition system according to embodiments of the present document. Model 150 is described with the following elements;

a( ): Mapping from identity to appearance. This is time & identity dependent function which is depicted in Model 150 as a( ) 152. This element includes dressing, adding accessories, hair styling and so on. An input to a( ) 152 is $\{I_1, \ldots, I_K\}$ 151, which indicates the identity of K subjects, i.e., the attending members.

c( ): Camera that maps appearance to visual data such as video, pictures, 3D pictures, and so on. These elements are depicted in model 150 as $c_1( )$ 156, ... $c_L( )$ 162.

r( ): Recognition function that maps collected visual data to the probability that the visual data is from identity n where n is one in member pool. These elements are depicted in model 150 as $r_1( )$ 158, ... $r_L( )$ 164.

m( ): Mapping from identity & camera information to contextual data. m( ) receives member data 154. m( ) elements are depicted in model 150 as $m_1( )$ 160, ... $m_L( )$ 166.

d( ): Decision function that combines all probabilities computed in r( ) and m( ) to determine the ID of the member. Note that this detection can use all data collected from all members who entered the member facility. This element is depicted in model 150 as: d( ) 168.

K: the number of attending members
M: the number of pictures per member from a camera
N: the number of all members
L: the number of cameras Example (2)

Consider member recognition system of FIG. 1B, comprising model 150, consisting of L cameras located at different part of the facility capturing M pictures per each member. Note that M can be different per different members at different time and different camera. Per model 150, $\{I_1, \ldots, I_K\}$ 151 is the sequence of identities of members (Identity of Subject k) who visited the facility over a certain time (e.g., a day). a( ) denotes a mapping between the identity and the appearance of a member. For example, a( ) may include wearing make-up, wearing different cloths or accessories, and applying different hair style. Note that a( ) is introduced to describe a model, as Appearance $\{A_1, \ldots, A_K\}$.

Each camera $c_i( )$ produces $P_{i,k}=[P_{i,k,1}, \ldots, P_{i,k,M}]$ pictures for each member. Based on the contextual data, $m_i( )$ produces $p_{a,i,k,m}$ the a priori probability of member m appears at camera i when the picture $P_{i,k,m}$ was taken. Note that a member does not necessarily appear in all cameras, and a member may appear in more than once in a camera. Using the pictures and a priori probabilities, the recognition block $r_i( )$ computes $p_{i,k,m}$, the probability that k-th picture from camera i is from the member m. Finally, the decision block d( ) determine the identity of pictures by combining the probabilities from all recognition blocks. Per FIG. 1B, the output of d(.) 168 is output 160 and has a value of $\{\hat{I}_1, \ldots, \hat{I}_K\}$.

In one embodiment, the decision block uses maximum likelihood detection that maximizes the likelihood that the picture k from camera c is from member m.

Figure 2:
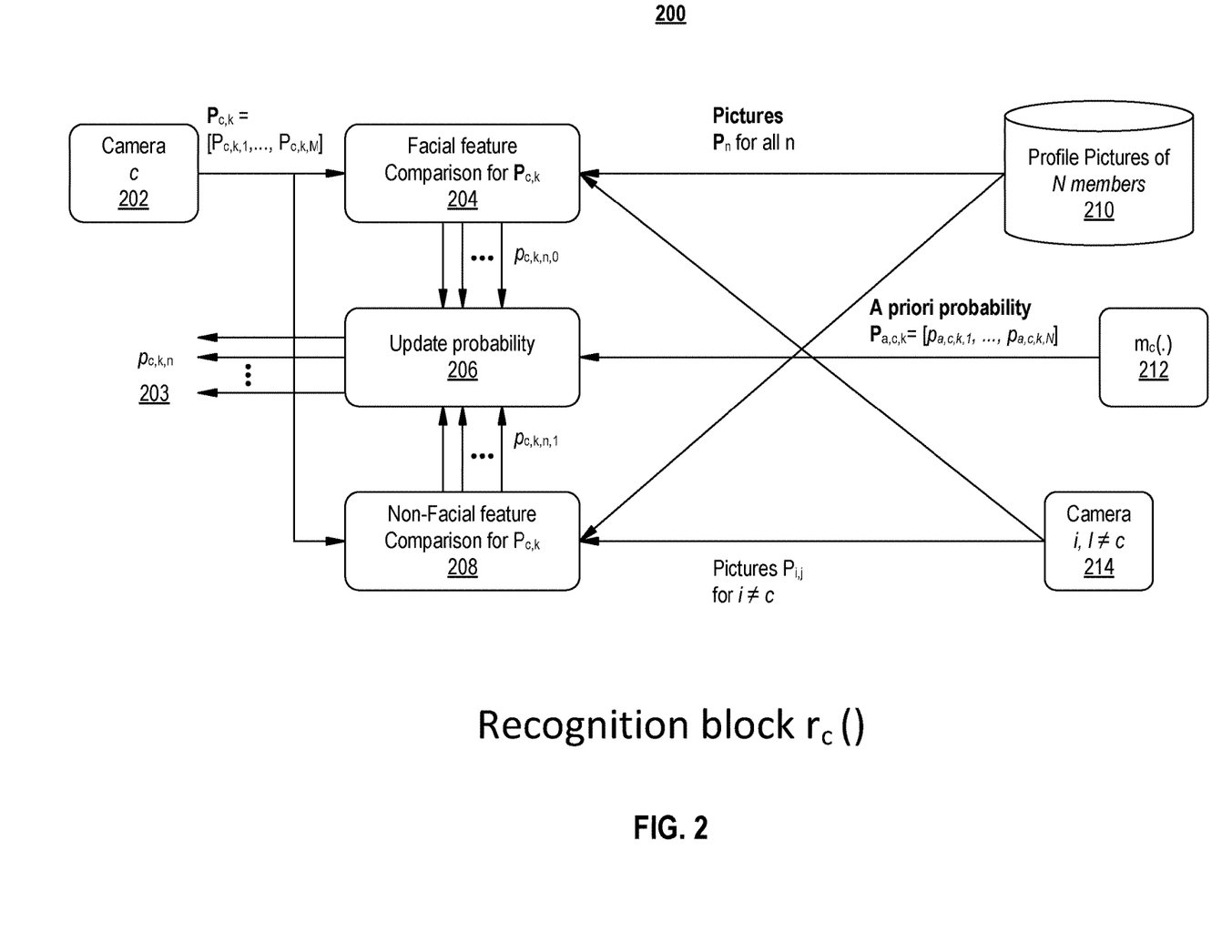
FIG. 2 depicts a recognition block according to embodiments of the present document.

FIG. 2 depicts a recognition block 200 according to embodiments of the present document. Recognition block 200 may perform facial recognition functions. Detail of recognition block 200 is shown in FIG. 2. The recognition block FIG. 2 compares the set of picture $P_{c,k,1}, \ldots, P_{c,k,M}$ captured by camera c 202 with the profile picture of all N members (Profile Pictures of N members 210) or with the pictures that were captured from other cameras, camera i, i≠c 214. In one embodiment, the comparison consists of comparing facial features, Facial feature Comparison for $P_{c,k}$ 204, and non-facial features, Non-Facial feature Comparison for $P_{c,k}$ 208. To compare non-facial features, the objects in the pictures are detected and then compared between pictures. Facial and non-facial feature comparison produces $p_{c,k,n,0}$ and $p_{c,k,n,1}$, which are the probability that the k-th picture from camera c 202 is from member n based on facial/non-facial features. Function $m_c(.)$ 212 combines the probabilities $p_{a,c,k,n}$ with a priori probability, produced by contextual information, to produce the $p_{c,k,n}$ 203, the probability that the k-th picture from camera c 202 is from member n. See Updated probability 206.

Figure 3:
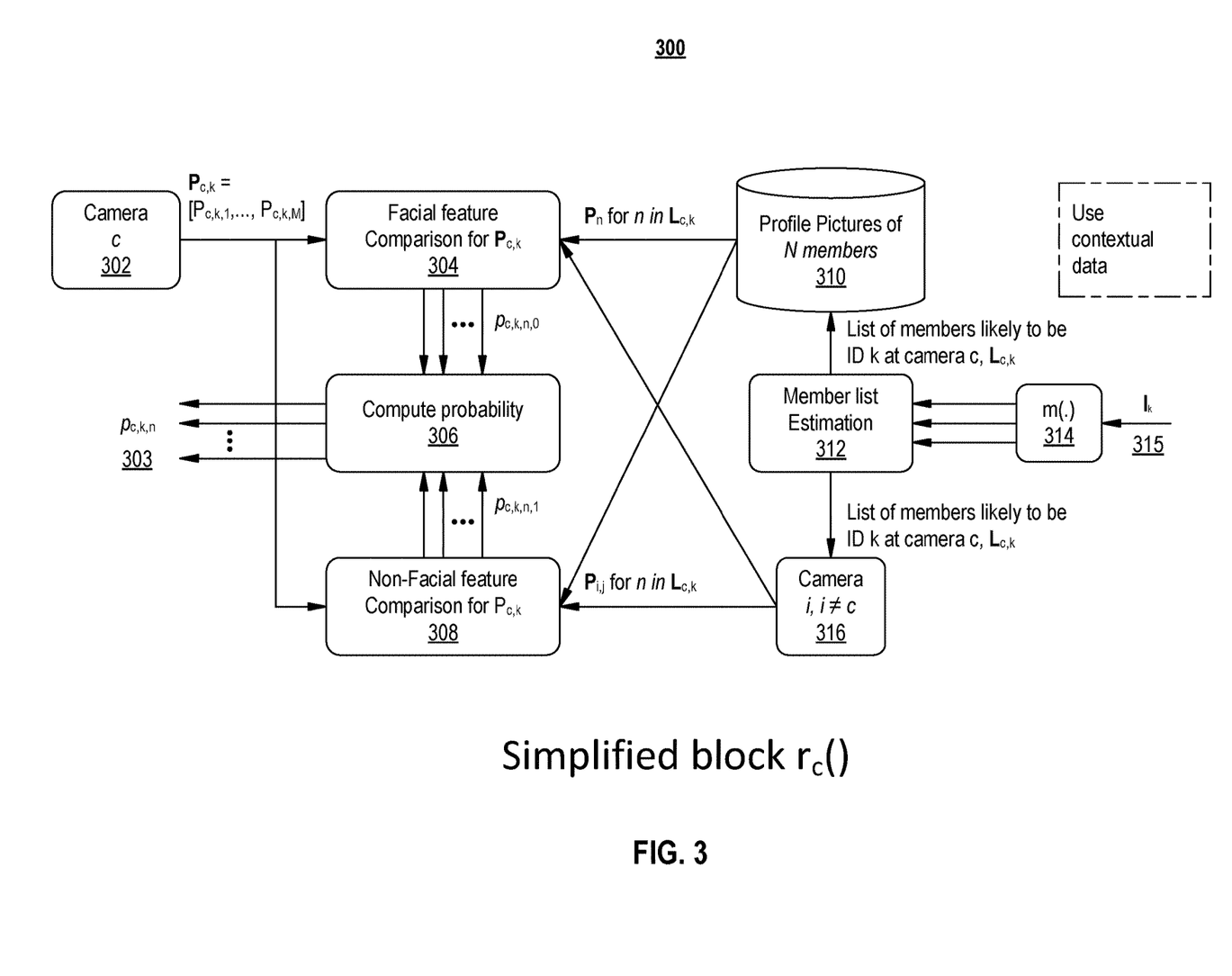
FIG. 3 depicts a simplified recognition block according to embodiments of the present document.
Figure 4:
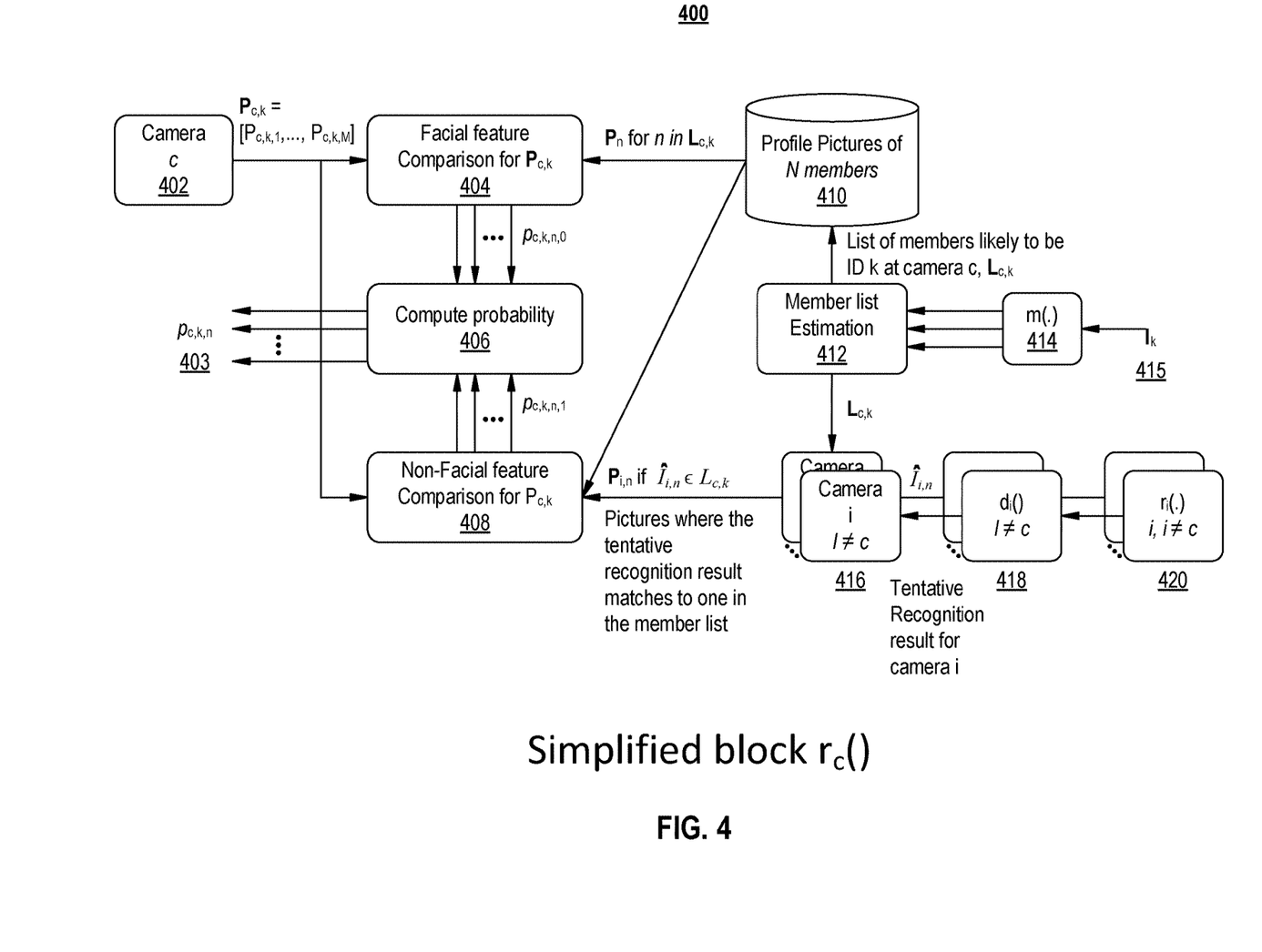
FIG. 4 depicts another simplified recognition block according to embodiments of the current disclosure.

Simplified recognition blocks are shown in FIG. 3 and FIG. 4. FIG. 3 depicts a simplified recognition block 300 according to embodiments of the present document. In FIG. 3, m( ) 314 generates from $I_k$ 315 the list of members (Member list Estimation 312) who are most likely to be captured by camera c 302 based on contextual information. For example, if there is no transactional information about member m when picture $P_{c,k}$ was taken, member may not be included in the list of members. Other functions in simplified recognition block 300 includes Profile Pictures of N members 310, Facial feature Comparison for $P_{c,k}$ 304, Non-Facial feature Comparison for $P_{c,k}$ 308, Camera i 316 and Compute probability 306. The output of Compute probability 306 is $p_{c,k,n}$, 303.

FIG. 4 depicts further simplifications in simplified recognition block 400 according to embodiments of the current disclosure. Similar to FIG. 3, in FIG. 4, m( ) 414 generates from $I_k$ 415 the list of members who are most likely to be captured by camera c 402 based on contextual information. For example, if there is no transactional information about member m when picture $P_{c,k}$ was taken, member may not be included in the list of members. In other example, if member m was detected by a camera i, 416, which is far away from camera c 402 when the picture $P_{c,k}$ was taken, then the member may not be included in the member list $L_{c,k}$ (Member list Estimation 412).

In simplified recognition block 400, a detector (di( ), i≠c 418) for camera i 416 computes the tentative decision on the identity of the picture taken by the camera i 416. And then, the non-facial features of the pictures whose tentative decision is in set $L_{c,k}$, which is the list of members likely to be at camera c when picture $P_{c,k}$ was taken, are compared with the non-facial feature of picture $P_{c,k}$ from camera c 402. See Profile Pictures of N members 410, Facial feature Comparison for $P_{c,k}$ 404, Non-Facial feature Comparison for $P_{c,k}$ 408, and Compute probability 406. The output of Compute probability 406 is $p_{c,k,n}$, 403.

Tentative decision for camera i can be made solely based on the pictures taken by camera i. For example, if the probability that $P_{ik}$ is a picture of member j with very high probability, we can tentatively conclude $I_{ik}$ as j and put this input to 416. Tentative input can be results of any processing consisting of subset of the entire processing described in this document.

The output of each recognition block ($r_i(.)$ i, i≠c 420) is {$p_{i,1}, \ldots, p_{i,K}$}, where is $p_{i,k}$ is a vector that contains the probabilities that the picture k from camera i 416 is from each member in the N member group set. And then the probabilities from different cameras are compared using parity check block. Parity check is a block that computes the a priori probabilities based on spatial and temporal constraints across cameras. For example, if a member m is captured in Camera j which is far from Camera i around the same time, the probability that the member m appeared in Camera i is very low, so the a priori probability $p_{a,i,k}$ should be lowered. Note that the a priori probability is updated based on the recognition result; therefore, the decision quality can be improved by iterating the same procedure for multiple times.

Figure 5:
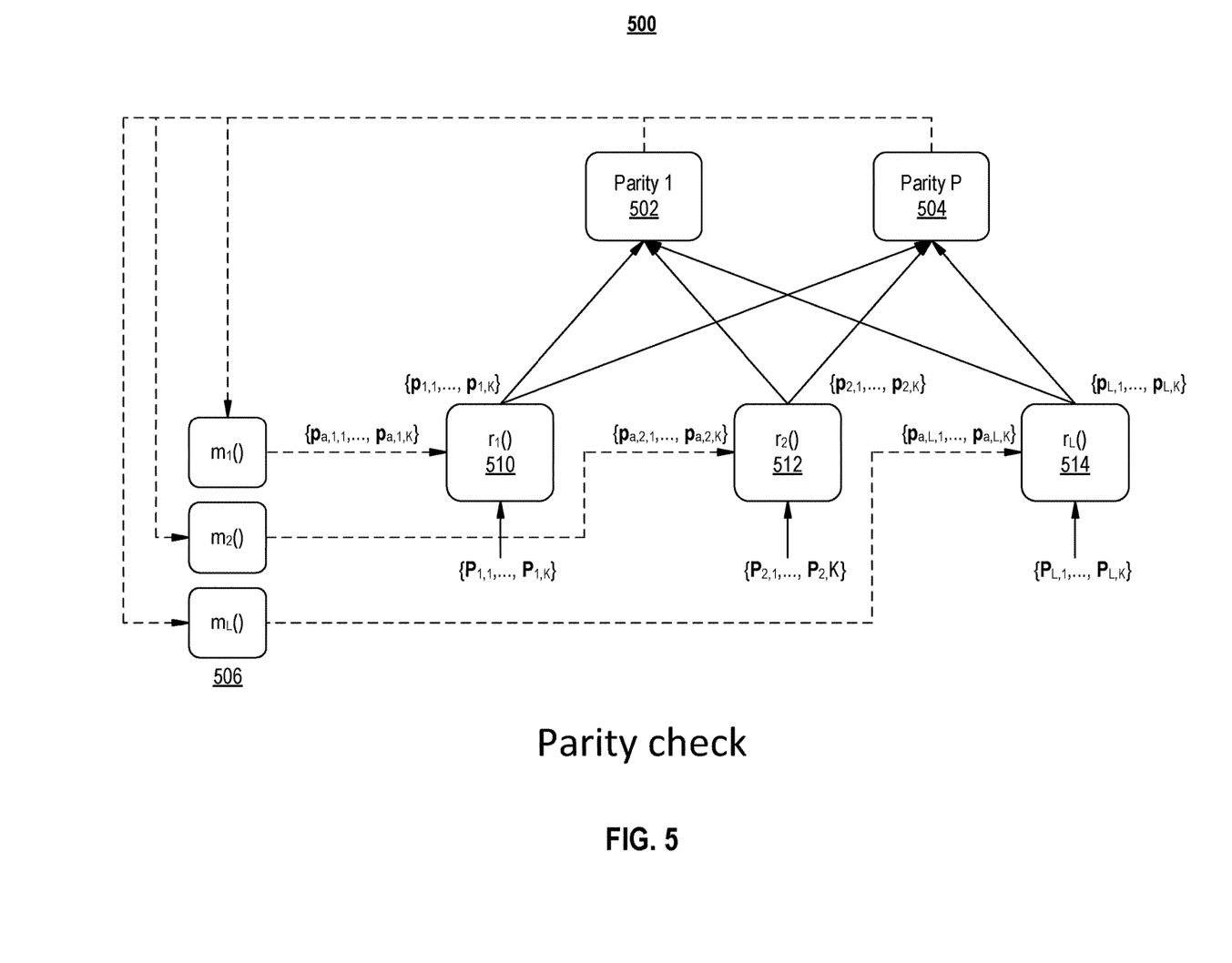
FIG. 5 depicts a simplified decision block or parity check block according to embodiments of the present disclosure.

FIG. 5 depicts a simplified decision block or parity check block 500 according to embodiments of the present disclosure. A parity check can evaluate spatial and temporal constraints across cameras. Each parity block receives the estimated probability that a member appears in cameras and then outputs the adjustment of a priori probability corresponding to the likelihood that such constraint is satisfied. A same member is not likely to appear in a set of cameras within a certain time. For example, but without limitation, a member k may not be likely to appear in a camera i at time $t_{i,k}$ unless the member has appeared in one of the check-in cameras j at time $t_{j,k}$ where $t_{i,k} > t_{j,k}$ because most of members would have checked-in from the counter before participating in the member activities. Let's defined this spatial and temporal constraint as Parity p. For a member k, the Parity p receives the probability from $r_i$, $p_{i,k}$, the probability from $r_j$, $p_{j,k}$, the time when the picture was taken at camera i, $t_{i,k}$, and the time when the picture was taken at camera j $t_{j,k}$; and outputs values $x_{i,k}$ and $x_{j,k}$, wherein, the value $x_{i,k}$ and $x_{j,k}$ increase if $p_{i,k}$ and $p_{j,k}$ are higher and $t_{i,k} - t_{j,k} <$ threshold. The output values $x_{i,k}$ and $x_{j,k}$ are used to update the a priori probability $p_{a,i,k}$ and $p_{a,j,k}$, in such as way that the higher x, the higher a priority probability. In another example, a member may be likely to appear in a camera if the member appeared in another camera that was placed in a route to the camera right before or after. The output of the parity block can be defined similarly. See functional blocks Parity 1 502 . . . Parity P 504, $m_1( ), m_2( ), \ldots, m_L( )$ 506, $r_1( ), r_2( ), \ldots, r_L( )$ 510, 512, 514.

In summary, a method for determining a member's identity in a member-only facility may comprise: 1) obtaining contextual information and the member data based on member's participation in member activities comprising current and historical participation; 2) obtaining a first set of probabilities for the each member in the member pool where the probabilities are the likelihood for a member to appear in the first set of pictures captured during member activities and are computed based on the contextual information and the member data.; 3) obtaining a second set probabilities for a match between a face in a first set of pictures and a first set of profile pictures of members listed in the member pool wherein the first set of profile pictures may include pictures of members that were taken during member activities at different time or different location; 4) combining the first set of probabilities and the second set of probabilities to determine the member with largest combined probability; (5) obtaining a third set of probabilities for a match between non-facial features in the first set of pictures, which was taken at the member activities, and a second set of profile pictures, wherein the second set of profile pictures may include pictures of members that were taken during member activities that occurred within a time interval that is shorter or equal to a time constant of the non-facial feature before and/or after a time when the first set of pictures were take; and 6) combining the first set of probabilities, the second set of probabilities, and/or the third set of probabilities to determine another member with largest combined probability.

The probability data on each member in a member pool, and the lists of member data based on their participation in a member pool activity comprise one or more of the following:
  probability that each member in the member pool attends member pool activity based on a time of check-in,
  a list of check-in members,
  a list of members in other group exercise studio,
  a list of members who reserved the class,
  a class schedule,
  a list of members who previously attended same class and/or same type of classes, and/or previous locations of the members detected by other cameras.

The time interval may be a current day, i.e. same day, of the member pool activity.

A system for determining a member's identity in a member pool activity may comprise: 1) one or more cameras that map the plurality of appearances to a plurality of visual data; 2) a mapping function that maps the plurality of the identities and information based on picture time and camera's location to generate contextual information and a set of a-priori probabilities that one of the plurality of identities appears at one of the one or more cameras when one of the plurality of visual data was mapped; 3) one or more recognition functions that map the plurality of visual data to a second set of probabilities which matched each of the one of the plurality visual data with each of the one of the plurality of identities; and 4) a decision function that combines the set of a priori probabilities and the second set of probabilities to determine one of the plurality of the identities. The member maps a plurality of identities to a plurality of appearances.

C. System Embodiments

In embodiments, aspects of the present patent document may be directed to or implemented on information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be a personal computer (e.g., laptop), tablet computer, pamphlet, personal digital assistant (PDA), smart phone, smart watch, smart package, server (e.g., blade server or rack server), a network storage device, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 6:
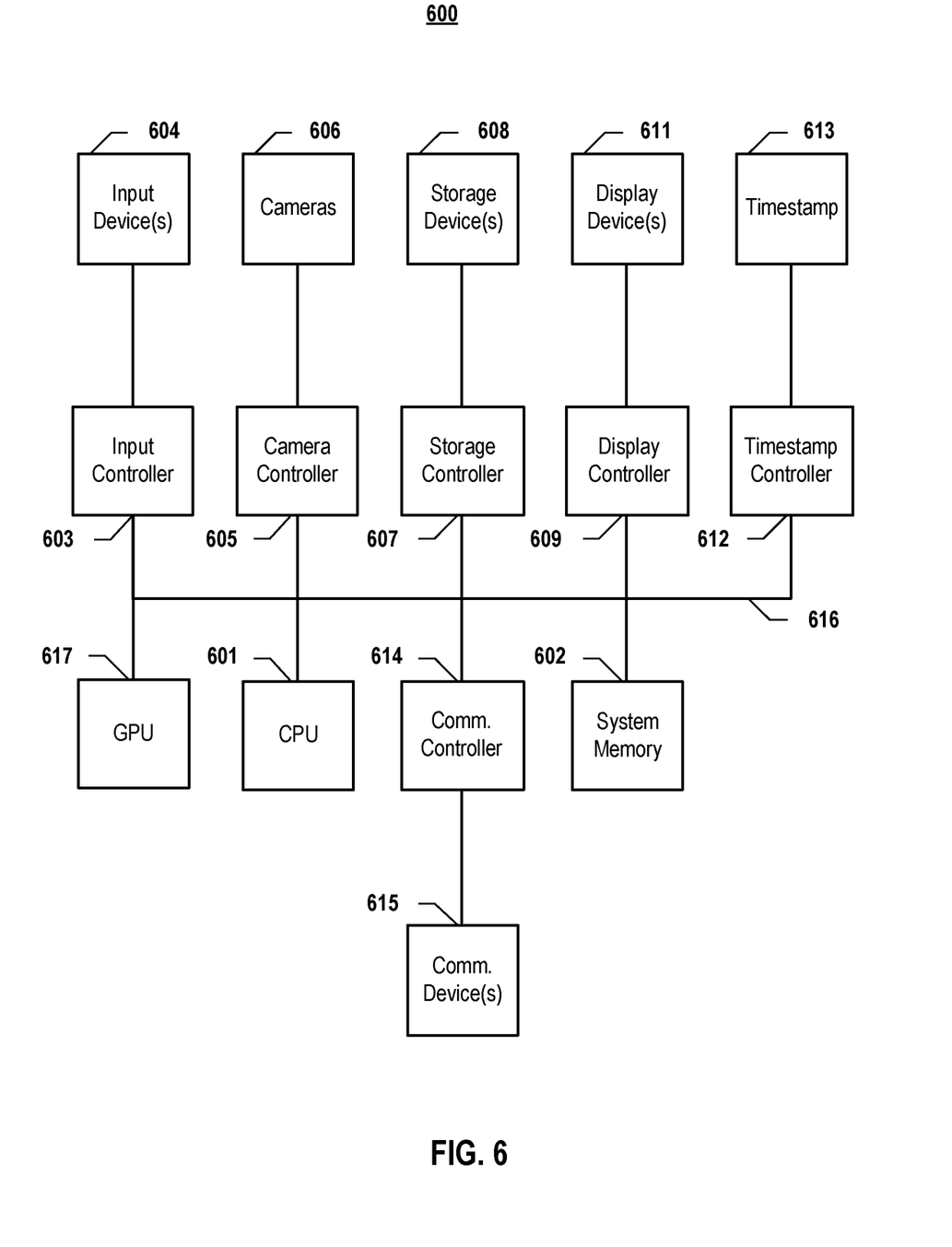
FIG. 6 depicts a simplified block diagram of a computing device/information handling system, in accordance with embodiments of the present document.

FIG. 6 depicts a simplified block diagram of a computing device/information handling system (or computing system) according to embodiments of the present disclosure. It will be understood that the functionalities shown for system 600 may operate to support various embodiments of an information handling system—although it shall be understood that an information handling system may be differently configured and include different components.

As illustrated in FIG. 6, system 600 includes one or more central processing units (CPU) 601 that provides computing resources and controls the computer. CPU 601 may be implemented with a microprocessor or the like, and may also include one or more graphics processing units (GPU) 617 and/or a floating point coprocessor for mathematical computations. System 600 may also include a system memory 602, which may be in the form of random-access memory (RAM), read-only memory (ROM), or both.

A number of controllers and peripheral devices may also be provided, as shown in FIG. 6. An input controller 603 represents an interface to various input device(s) 604, such as a keyboard, mouse, or stylus. There may also be a camera controller 605, which communicates with a camera 606. System 600 may also include a storage controller 607 for interfacing with one or more storage devices 608 each of which includes a storage medium such as magnetic tape or disk, or an optical medium that might be used to record programs of instructions for operating systems, utilities, and applications, which may include embodiments of programs that implement various aspects of the present invention. Storage device(s) 608 may also be used to store processed data or data to be processed in accordance with the invention. System 600 may also include a display controller 609 for providing an interface to a display device 611, which may be a cathode ray tube (CRT), a thin film transistor (TFT) display, or other type of display. The computing system 600 may also include a timestamp controller 612 for communicating with a timestamp 613. A communications controller 614 may interface with one or more communication devices 615, which enables system 600 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 616, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method comprising:
   obtaining contextual information and member data based on member's participation in member activities comprising current and historical participation;
   generating a first set of probabilities for members in a member pool based on the contextual information and/or the member data, each of the first set of probabilities is a likelihood for one member to appear in a first set of pictures captured during member activities;
   generating a second set of probabilities of a match between a face in the first set of pictures, and a first set of profile pictures of a list of members in the member pool;
   combining the first set of probabilities and the second set of probabilities to determine a member with largest combined probability.

2. The method of claim 1, further comprising:
   generating a third set of probabilities for a match between non-facial features in the first set of pictures, which were taken at the member activities, and a second set of profile pictures, wherein the second set of profile pictures includes pictures of members that were taken during the member activities which occurred within a time interval before and/or after a time when the first set of pictures were taken.

3. The method of claim 2, further comprising:
   combining the first set of probabilities, the second set of probabilities, and the third set of probabilities to determine another member with another largest combined probability.

4. The method of claim 2, further comprising determining a list of members in the member pool whose probability of attendance to a member activity meets a threshold.

5. The method of claim 1, wherein the contextual information comprises information related to current circumstances when a photo is taken.

6. The method of claim 1, wherein the member data is information of history of the member activities that members participate in at a member facility.

7. The method of claim 1, wherein the member activities occur at a gym.

8. The method of claim 1, wherein the first set of profile pictures includes pictures of members that were taken during the member activities at different times and/or different locations.

9. The method of claim 1, wherein the first set of probabilities for each member in a member pool is based on one or more of the following:
   probability that each member in the member pool attends a member pool activity based on a time of check-in,
   a list of check-in members,
   a list of members in other group exercise studio,
   a list of members who reserved a class,
   a class schedule,
   a list of members who previously attended same class and/or same type of classes, and/or previous locations of members detected by other cameras.

10. The method of claim 1, further comprising generating a priori probabilities for updating the second set of probabilities, wherein the priori probabilities are based on spatial and temporal constraints across cameras.

11. The method of claim 1, further comprising determining a tentative decision on an identity of a picture taken by a camera based on facial features of the picture, non-facial features of the picture and the associated contextual information, wherein the non-facial features of the picture are compared with the non-facial features of another picture from another camera.

12. A system comprising:
    one or more cameras that map a plurality of appearances to a plurality of visual data;
    a mapping function that maps a plurality of identities and camera information to generate contextual information and a set of priori probabilities that one of the plurality of identities appears at one of the one or more cameras when one of the plurality of visual data was mapped, each of the set of priori probabilities is a likelihood for one member in a member pool to appear in a first set of pictures captured during member activities;
    one or more recognition functions that map the plurality of visual data to a second set of probabilities which match each of the plurality of visual data with each of the plurality of identities; and
    a decision function that combines the set of a priori probabilities and the second set of probabilities to determine one of the plurality of the identities.

13. The system of claim 12, wherein the one or more recognition functions comprises facial features comparisons and non-facial feature comparisons that process the camera information, profile pictures and the set of a priori probabilities for updating a probability.

14. The system of claim 13, further comprising a member database, which comprises information of history of member activities that members participate in at a member facility.

15. The system of claim 12, wherein the set of priori probabilities is based on spatial and temporal constraints across the one or more cameras.

16. The system of claim 12, wherein the set of priori probability is updated based on a recognition result.

17. A non-transitory computer readable storage medium having computer program code stored thereon, the computer program code, when executed by one or more processors implemented on a system, causes the system to perform a method comprising:

generating a first set of probabilities for members in a member pool based on contextual information and/or member data, each of the first set of probabilities is a likelihood for one member to appear in a first set of pictures captured during member activities;

generating a second set of probabilities of a match between a face in the first set of pictures, and a first set of profile pictures of a list of members in the member pool whose probability of attendance to the member activities meets a threshold;

combining the first set of probabilities and the second set of probabilities to determine a member with largest combined probability.

18. The method of claim 17, further comprising obtaining contextual information and member data based on member's participation in the member activities comprising current and historical participation.

19. The method of claim 17, further comprising:

generating a third set of probabilities for a match between non-facial features in the first set of pictures, which were taken at the member activities, and a second set of profile pictures, wherein the second set of profile pictures includes pictures of members that were taken during the member activities which occurred within a time interval before and/or after a time when the first set of pictures were taken.

20. The method of claim 19, further comprising:

combining the first set of probabilities, the second set of probabilities, and the third set of probabilities to determine another member with largest combined probability.

* * * * *